E. PAGE.
Sheep Rack and Holder.
No. 55,896.
Patented June 26, 1866.
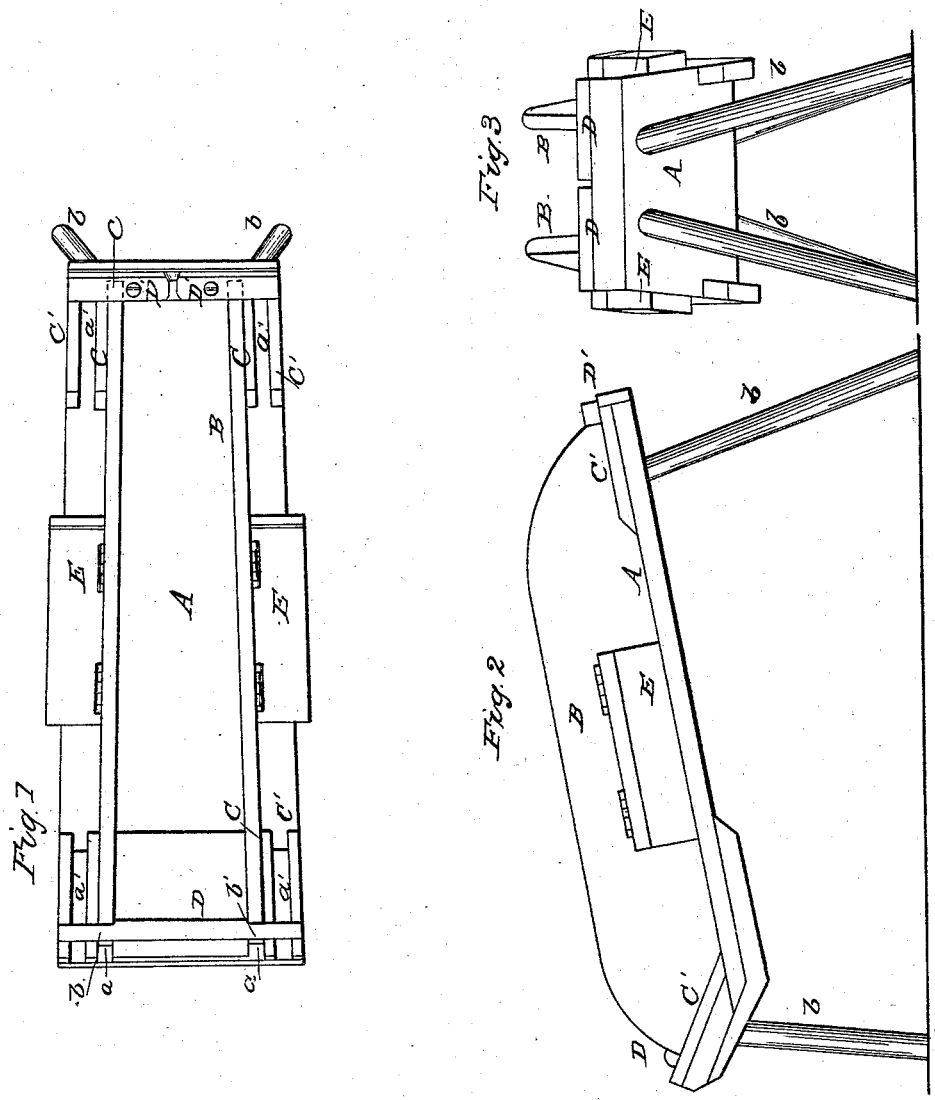

UNITED STATES PATENT OFFICE.

ENOS PAGE, OF STREETSBOROUGH, OHIO.

SHEEP RACK AND HOLDER.

Specification forming part of Letters Patent No. 55,896, dated June 26, 1866.

*To all whom it may concern:*

Be it known that I, ENOS PAGE, of Streetsborough, in the county of Portage and State of Ohio, have invented certain new and useful Improvements in a Sheep Rack and Holder; and I do hereby declare that the following is a full and complete description of the same, reference being had to the accompanying drawings, making a part of this specification, in which—

Figure 1 is a top view of the rack. Fig. 2 is a side view. Fig. 3 is an end view.

Like letters of reference refer to like parts in the several views.

A is the seat or bottom of the holder, supported on legs $b$ at the ends, and is made of two pieces secured together at $a$, from which they incline upward toward each end, as represented in Fig. 2.

B B are adjustable sides of the holder, placed upright on the bottom at a distance more or less from the side edges, the under side of these edges corresponding with the shape of the bottom, and the upper side being curved at each end, as shown in Fig. 2.

At each end of the bottom or seat A are grooves $a$ $a'$, formed by cleats C C' fastened to the bottom A, or they may be cut out of the bottom A. In these grooves the under side of the sides B B rest, the lip $b'$ passing under the cleat D, and the buttons D' at the other end of the holder turn over the lips $b''$ that rest in the grooves $a$, the lips (indicated by the dotted lines $c$ in Fig. 1) thus holding the sides in place, so that they cannot be raised up. These lips $b$ $b'$ form a part of and extend out from the end of the side pieces, B. To each side B is fastened a box, E, for the purpose of holding the tools and medicines required in tending the sheep, and they also form braces for the sides, preventing them from being pushed or turned down.

If desired, one side B can be made permanent and the other extension, or both extension, as in the drawings. By turning the buttons D', the sides can be taken out and moved from the grooves $a$ into the grooves $a'$, thus making the space between them larger, or only one may be moved. Thus the space can be made as much larger as desired, being adjusted to the size of the sheep, and more grooves can be made if desired.

What I claim as my improvement, and desire to secure by Letters Patent, is—

The adjustable sides B B, lips $b'$ $b''$, and grooves $a$ $a'$, in combination with the cleat D and buttons D', arranged as and for the purpose set forth.

ENOS PAGE.

Witnesses:
 W. H. BURRIDGE,
 FRANK ALDEN.